US008915130B1

(12) United States Patent  
Huang (10) Patent No.: US 8,915,130 B1  
(45) Date of Patent: Dec. 23, 2014

(54) BATTERY-REPLACEABLE TIRE PRESSURE SENSOR

(71) Applicant: Sung Jung Minute Industry Co., Ltd., Hsinchu County (TW)

(72) Inventor: Wen-Huo Huang, Hsinchu County (TW)

(73) Assignee: Sung Jung Minute Industry Co., Ltd., Hsinchu County (TW)

( * ) Notice: Subject to any disclaimer, the term of this patent is extended or adjusted under 35 U.S.C. 154(b) by 0 days.

(21) Appl. No.: 14/044,211

(22) Filed: Oct. 2, 2013

(51) Int. Cl.  
*B60C 23/02* (2006.01)  
*G01L 17/00* (2006.01)

(52) U.S. Cl.  
CPC .................. *G01L 17/005* (2013.01)  
USPC ........................ 73/146.3; 340/442

(58) Field of Classification Search  
USPC ................................. 73/146–146.8  
See application file for complete search history.

(56) References Cited

U.S. PATENT DOCUMENTS

| 6,194,998 B1 * | 2/2001 | Huang | 340/442 |
| 2007/0193349 A1 * | 8/2007 | Petrucelli | 73/146.8 |
| 2008/0289406 A1 * | 11/2008 | Benatti et al. | 73/146.3 |
| 2011/0192221 A1 * | 8/2011 | Wang et al. | 73/146.8 |

FOREIGN PATENT DOCUMENTS

| TW | M335410 U | 7/2008 |
| TW | M405977 U | 6/2011 |

* cited by examiner

*Primary Examiner* — Andre Allen  
(74) *Attorney, Agent, or Firm* — Muncy, Geissler, Olds & Lowe, P.C.

(57) ABSTRACT

A battery-replaceable tire pressure sensor is installed on a tire rim with an assembly through hole formed thereon, and includes a sensor body, a gas intake nozzle connected to the sensor body, and a gas nozzle assembly member coupling with the sensor body and the gas intake nozzle. The sensor body includes a tire pressure sensing module disposed therein for detecting a tire pressure, a battery accommodating portion accommodating at least one battery, a cover screwed with the battery accommodating portion, and a gas nozzle assembly hole for the gas nozzle assembly member to penetrate. The gas intake nozzle includes a coupling section inserted into the gas nozzle assembly hole, and a gas intake section connecting to the coupling section, penetrating through the assembly through hole, and extending outside the tire rim for gas to input.

9 Claims, 5 Drawing Sheets

BATTERY-REPLACEABLE TIRE PRESSURE SENSOR

FIELD OF THE INVENTION

The present invention relates to a tire pressure sensor, and more particular to a tire pressure sensor with a replaceable battery structure.

BACKGROUND OF THE INVENTION

Driving safety is the primary consideration for a driver when driving and travelling on the road. The tire pressure is one of key factors of vehicle conditions, and has a critical influence on driving safety. A vehicle can run smoothly only with a normal tire pressure. An excessive or insufficient tire pressure may result in a punctured tire or a flat tire, which severely jeopardizes driving safety and even threatens the safety and wellbeing of passersby. Needless to say, monitoring a tire pressure for ensuring driving safety must be is attended with great importance. A conventional method for measuring a tire pressure can only be performed for a still vehicle, and changes of the tire pressure for a driving vehicle cannot be detected in real-time. That is, a driver may not immediately learn about abnormalities in a tire during driving, and may not accordingly take appropriate actions in the event of the abnormalities.

To better and more conveniently detect a tire pressure, various tire pressure detection devices, which can be installed to a tire, have been developed by associated manufacturers to enable a driver to learn about the changes of the tire pressure in real-time. The Taiwan Utility Model No. M335410 discloses a "Wireless Tire Pressure Detector", as a built-in tire sensor. The disclosed tire pressure detector includes a sensor unit, and a gas nozzle unit integrated with the sensor unit. The sensor unit includes a housing, a circuit board disposed in the housing, and a gasket inserted at the housing. The housing has a gas intake, and a channel adjoining with the gas intake. The gasket is disposed at the gas intake and includes a connecting portion electrically connected to the circuit board. The gas nozzle unit includes a pipe member that may be utilized as an antenna, at least one washer accommodating around the pipe member, a cap screwed to one end of the pipe member, and at least one screw nut screwed to another end of the pipe member. As the fastening effect provided by the screw nut is greater than that of a conventional screw, the stability of the engagement between the sensor unit and the gas nozzle unit is improved.

The Taiwan Utility Model No. M405977 discloses a "Tire Pressure Sensor and Gas Nozzle Assembly". The disclosed structure is formed by a gas nozzle, a tire pressure sensor, and a screw bolt fastening the gas nozzle and the tire pressure sensor. The gas nozzle includes a connecting portion which includes an outer adjustment surface. The tire pressure includes a housing, which has a connecting channel connected to the connecting portion of the gas nozzle. Further, the connecting channel includes an inner adjustment surface forming in a shape complementary to that of the outer adjustment surface. Through the outer adjustment surface and the inner adjustment surface, the connecting portion of the gas nozzle is merely allowed to rotate towards a predetermined direction relative to the connecting channel. As such, the tire pressure sensor and the gas nozzle are prohibited from arbitrary rotations when fastened by the screw bolt, so as to reduce complications when installing the tire pressure detector on a tire rim.

The above disclosures of M335410 and M405977 are both built-in tire pressure sensors that are installed to the inside of a tire to detect the tire pressure. A high temperature is generated by friction between a tire and the ground during a driving process. Under such high-temperature and high-pressure harsh operating environment in the tire, the tire pressure sensor requires a high level of air tightness to prevent dust or moisture from entering the housing and thus affecting operations of the sensor unit. Therefore, for the above built-in tire pressure sensor, the housing is completely sealed after assembling with the sensor unit and a battery to ensure the overall air tightness. This implies that, once electrical power of the battery is depleted, the tire pressure sensor/detector of the disclosures M335410 and M405977 can no longer operate and be utilized. Even when the sensor unit is functional and undamaged, a new tire sensor needs to be purchased, which not only results in an additional cost for a driver but also produces unnecessary wastes.

SUMMARY OF THE INVENTION

Therefore the primary object of the present invention is to provide a built-in tire pressure sensor with a replaceable battery structure, so that, instead of being discarded, the tire pressure sensor can continue to be utilized when electrical power in the tire pressure sensor runs out.

To achieve the above object, a tire pressure sensor with a replaceable battery is provided. The tire pressure sensor, which can be installed to a tire rim having an assembly hole, includes a sensor body, a gas intake nozzle connected to the sensor body, and a gas nozzle assembly member coupling with the gas intake nozzle. The sensor body includes a tire pressure sensing module, a battery accommodating portion, a cover and a gas nozzle assembly hole. The tire pressure sensing module is disposed in the sensor body for detecting a tire pressure. The battery accommodating portion accommodates at least one battery, which supplies power to the tire pressure sensing module. The cover is screwed with the battery accommodating portion, and retains the battery from disengaging from the battery accommodating portion. The gas nozzle assembly hole is for the gas nozzle assembly member to insert therein. The gas intake nozzle includes a coupling section and a gas intake section. The coupling section is inserted into the gas nozzle assembly hole. The gas intake section is connected to the coupling section, and penetrates through the assembly through hole to extend towards a direction out of the tire rim for gas to input.

In one embodiment, the sensor body comprises a first housing and a second housing. The first housing includes an accommodating chamber to accommodate the tire pressure sensing module, and the second housing engages with the first housing to enclose the accommodating chamber.

In one embodiment, the tire pressure sensing module comprises a sensing module which includes a sensing region and saves a firmware for controlling operation of the tire pressure sensing module. Besides, the sensor body comprises a gas intake portion corresponding to the sensing region, and a washer disposed between the gas intake portion and the sensing region.

In one embodiment, the tire pressure sensing module further comprises at least one firmware update terminal disposed correspondingly to the battery accommodating portion. The firmware update terminal transmits update firmware data to the sensing module for updating the firmware.

In one embodiment, the coupling section further comprises an assembly hole facing the gas nozzle assembly hole to couple with the gas nozzle assembly member, and a positioning groove engaging with the assembly through hole to fasten the gas intake nozzle on the tire rim.

In one embodiment, the sensor body further includes an electromagnetic wave transmission element. The electromagnetic wave transmission element is electrically connected to the tire pressure sensing module to output tire condition information generated by the tire pressure sensing module after detecting the tire pressure.

In One embodiment, the electromagnetic wave transmission element includes a through hole. The through hole corresponds to the gas nozzle assembly hole for the gas nozzle assembly member to penetrate.

In one embodiment, the sensor body further includes a seal ring disposed between the battery accommodating portion and the cover.

In one embodiment, the sensor body further includes at least one support member disposed on a surface facing the tire rim. The support member abuts against the tire rim.

In the present invention, the sensor body includes a battery accommodating portion for accommodating at least one battery, and a detachable cover screwed with the battery accommodating portion. Thus, when electrical power of the sensor body is depleted, the depleted battery may be replaced with a new one, so that the tire pressure sensor can continue to be utilized instead of being replaced by a new tire pressure sensor. Therefore, not only an expense for purchasing a new tire pressure sensor can be saved, but also the amount of wastes is reduced. Further, a sealing ring, when the cover is screwed with the battery accommodating portion, is accommodated around the battery accommodating portion and is clamped between the cover and the first housing. Thus, the sealing ring completely fills possible space between the cover and the battery accommodating portion, thereby further reinforcing the air tightness effect of the battery accommodating portion and preventing dust or moisture from entering the sensor body.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENTS

Figure 1:
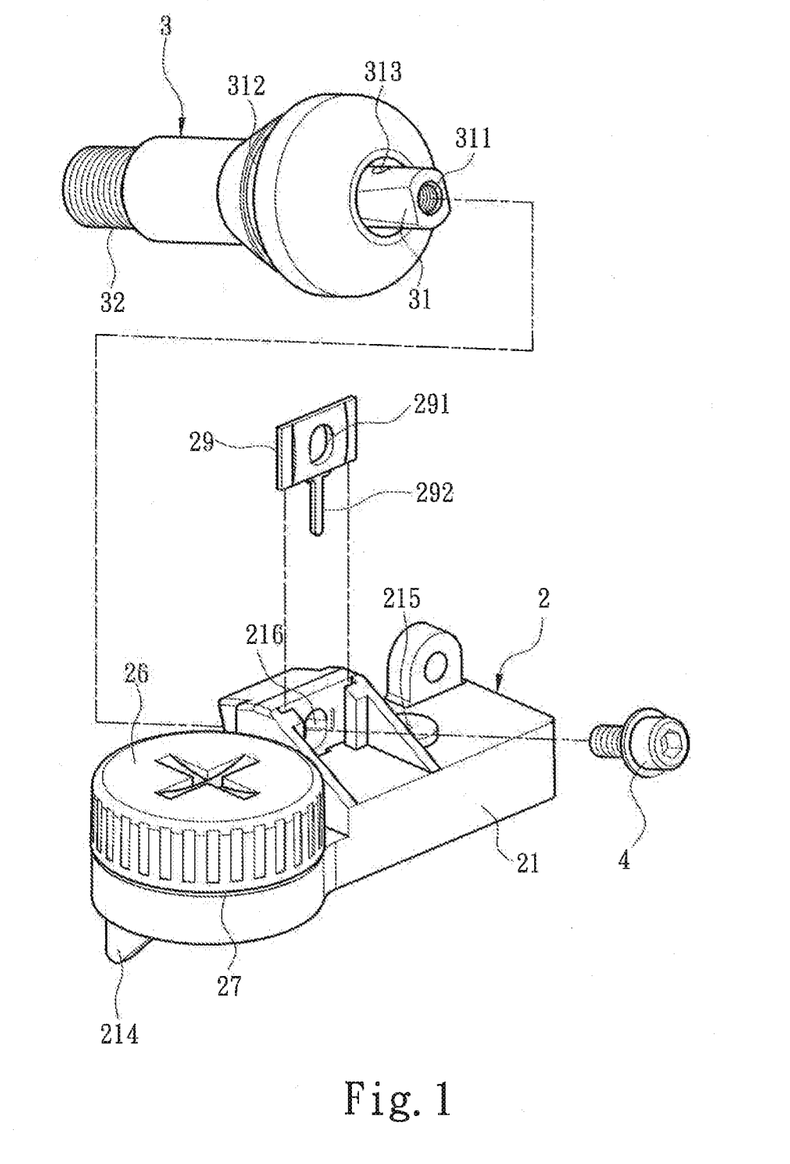
FIG. 1 is a schematic view of a battery-replaceable tire pressure sensor according to an embodiment of the present invention.
Figure 2:
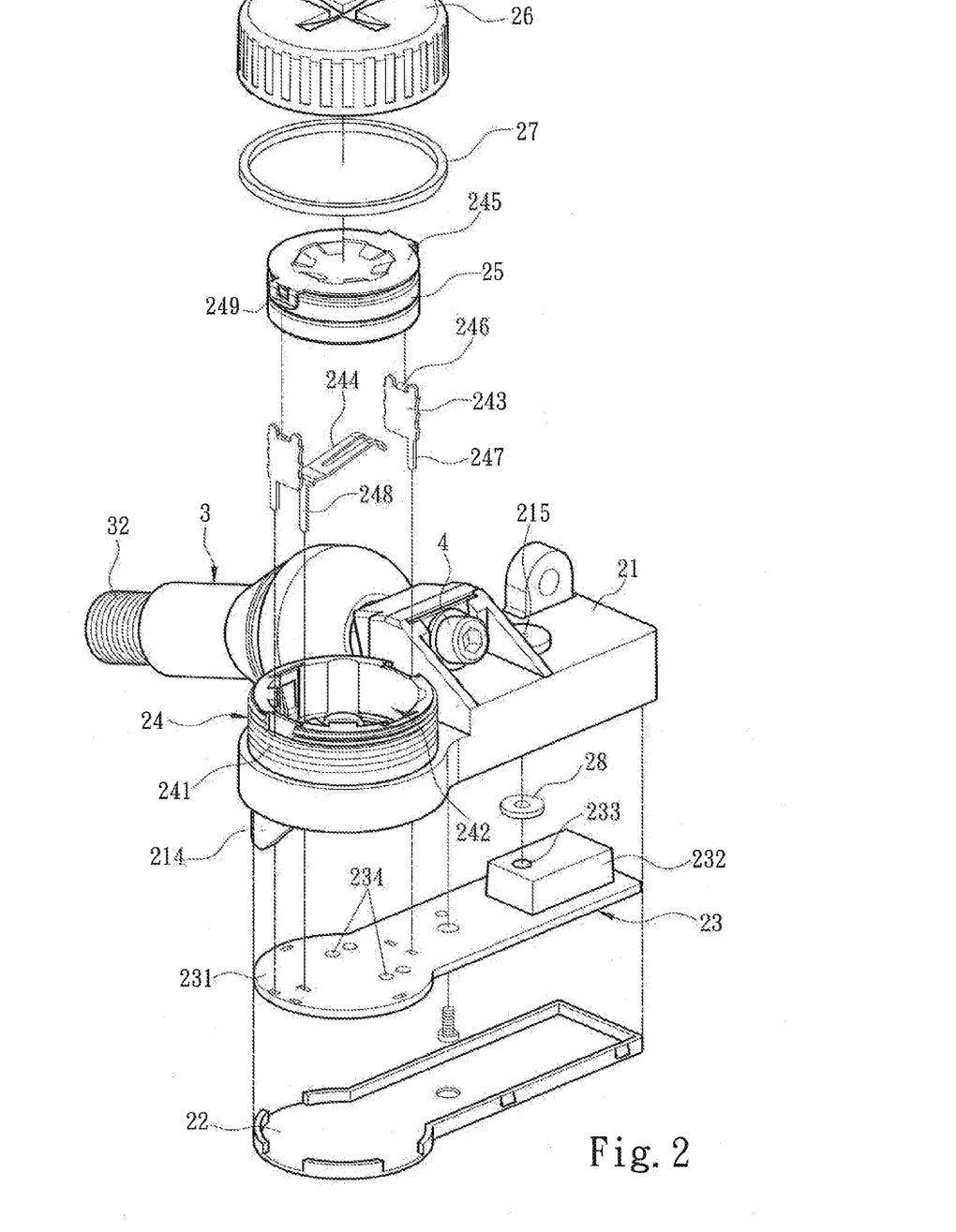
FIG. 2 is an exploded view of the battery-replaceable tire pressure sensor according to the embodiment of the present invention.
Figure 5:
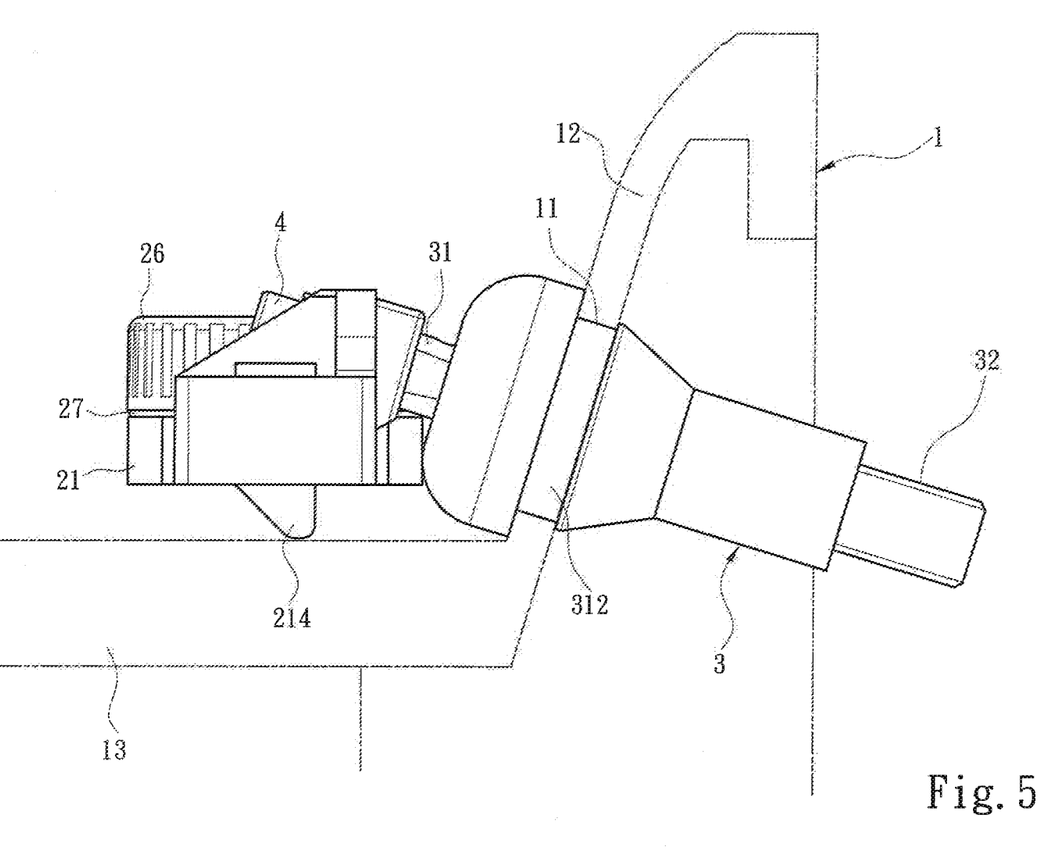
FIG. 5 is a schematic view of the battery-replaceable tire pressure sensor according to the embodiment of the present invention when in use.

FIGS. 1, 2 and 5 are a schematic view, an exploded view, and a schematic view of using a battery-replaceable tire pressure sensor of the present invention. As shown, the battery-replaceable tire pressure sensor of the present invention may be installed on a tire rim 1 of a tire (not shown). The tire rim 1 includes two folded section 12 at two sides thereof to engage with a tire body (not shown), a connecting section 13 connecting the two folded sections 12, and an assembly through hole 11 disposed between one of the folded sections 12 and the connecting section 13. The battery-replaceable tire pressure sensor includes a sensor body 2, a gas intake nozzle 3 connected to the sensor body 2, and a gas nozzle assembly member 4 assembling the sensor body 2 with the gas intake nozzle 3. The sensor body 2 includes a tire pressure sensing module 23 disposed in the sensor body 2, and a battery accommodating portion 24 and a gas nozzle assembly hole 216 that are disposed at an outer surface of the sensor body 2. The tire pressuring sensing module 23 includes a circuit board 231 and a sensing module 232 disposed on the circuit board 231. The sensing module 232 stores a firmware for controlling operations of the tire pressure sensing module 23, and includes a sensing region 233. Further, the sensor body 2 includes a gas intake portion 215 and a washer 28. The gas inlet portion 215 is disposed correspondingly to the sensing region 233. The washer 28 is disposed correspondingly to positions of the gas intake portion 215 and the sensing region 233, and is clamped between the sensor body 2 and the tire pressure sensing module 23. After gas in the tire enters the sensor body through the gas intake portion 215, the gas is restricted by the washer 28 and then directly reaches the sensing region 233. Thus, the sensing module 232 detects data such as the tire temperature and tire pressure in the tire through the sensing region 233, generates correspondingly tire condition information, and transmits the tire condition information to a monitoring device (not shown) via wireless transmission. The monitoring device may be disposed near a driver seat for a driver to easily observe, or may be incorporated into a vehicle computer and directly displayed on a dashboard of a vehicle, so as to allow a driver to learn whether conditions of the tire are abnormal in time.

In the above embodiment, the sensor body 2 is exemplified by a single housing. In a preferred embodiment of the present invention, the sensor body 2 comprises a first housing 21, and a second housing 22 that can be engaged with the first housing 21. The first housing 21 includes an accommodating chamber 211, with an opening facing the connecting section 13 of the tire rim 1, for accommodating the tire pressure sensing module 23 (as shown in is FIGS. 3 and 4). By engaging the second housing 22 with the first housing 21, the accommodating chamber 211 is covered by the second housing 22 to form an enclosed space that retains the tire pressure sensing module 23 therein. To ensure the accommodating chamber 211 is in a completely airtight state when the second housing 22 is engaged with the first housing 21, an adhesive (not shown) may further be applied to contact parts of the second housing 22 and the first housing 21. As such, dust generated from frictions of the tire or moisture is prevented from entering the accommodating chamber 211 as well as from affecting the durability of the tire sensing module 23. In a preferred embodiment of the present invention, the battery accommodating portion 24 and the gas nozzle assembly hole 216 are disposed at a surface of the first housing 21 opposite the opening of the accommodating chamber 211.

Figure 4:
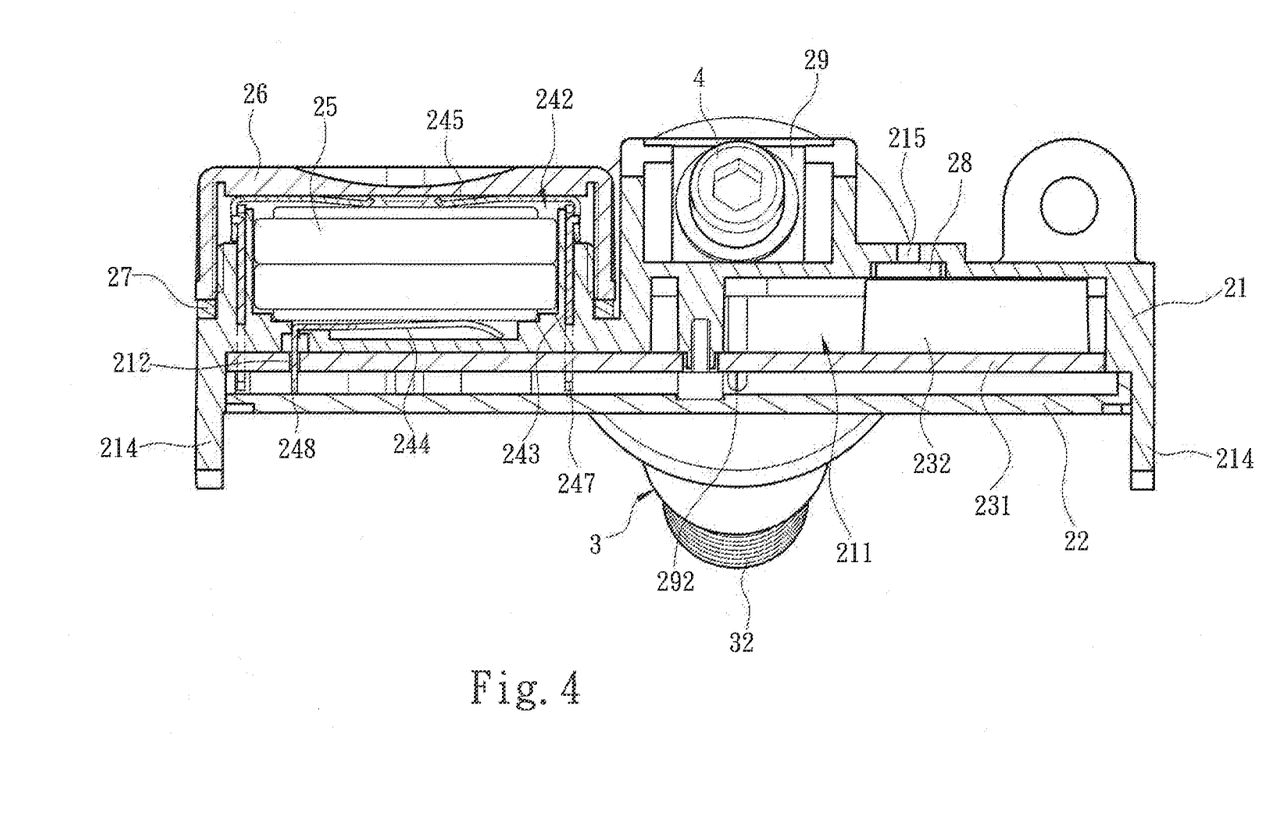
FIG. 4 is a sectional view of a sensor body of the battery-replaceable tire pressure sensor according to the embodiment of the present invention.

Referring to FIG. 2, the battery accommodating portion 24 includes an outer screw thread wall 241 appearing a ring shape, and a battery recess 242 encircled by the outer screw thread wall 241 for accommodating at least one battery 25. Further, the first housing 21 includes a hollow region (not shown) at a bottom part of the battery recess 241 to communicate the battery recess 241 with the accommodating chamber 211. In the embodiment, the battery 25 is a lithium button battery, which is not the limitation. Alternatively, the battery may be a mercury battery; an alkaline battery or a zinc-air battery. The battery recess 242 includes at least one first conductor 243, a second conductor 244, and a pressure conductor 245 which are all disposed in the battery recess 242. The positive and negative ends of the battery 25 are respectively in contact with the pressure conductor 245 and the second conductor 244. The pressure conductor 245 further includes a fixing end 249, through which the pressure conductor 245 is connected to a connecting end 246 of the first conductor 243. In the embodiment, the fixing end 249 may be a hook groove, and the connecting end 246 may be a hook tenon for engaging with the hook groove. Referring to FIG. 4, the first housing 21 further includes a plurality of transmission holes 212 disposed at the bottom part of the battery recess 242. The first conductor 243 and the second conductor 244 respectively include a first conducting pin 247 and a second conducting pin 248. The first conducting pin 247 and the second conducting pin 248 are penetrated through the transmission holes 212 from the battery recess 242 to the accommodating chamber 211 to electrically connect to the tire pressure sensing module 23. During installing, the battery 25 is placed in the battery recess 242 with the negative end of the battery 25 facing the battery recess 242, such that the negative end of the battery 25 comes into contact with the second conductor 244 disposed in the battery recess 242. The presser conductor 245 is then placed on the positive end of the battery 25, and the fixing end 249 is engaged with the connecting end 246 of the first conductor 243, such that the battery 25 forms an electrical connection with the tire pressure sensing module 23 via the first conducting pin 247 of the first conductor 243 and the second conducting pin 248 of the second conductor 244, as shown in FIG. 4, thereby providing electrical power for operating the tire pressure sensing module 23. The sensor body 2 further includes a cover 26 corresponding to the battery accommodating portion 24. The cover 26 includes a screw thread inside (not shown), and is screwed with the outer screw thread wall 241 to seal the battery recess 242 of the batter accommodating portion 24, so as to retain the battery 25 therein. To further improve the air tightness between the battery accommodating portion 24 and the cover 26, a sealing ring 27 may be additionally accommodated around the outer screw thread wall 241. When the cover 26 is screwed with the outer screw thread wall 241, the sealing ring 27 is clamped by the cover 26 and the first housing 21, so as to prevent moisture from entering the battery recess 242 along a gap between the outer screw thread wall 241 and the screw thread of the cover 26, thereby providing further enhanced air tightness effects.

The tire pressure sensing module 23 further includes at least one firmware update terminal 234 located on the circuit board 231. The firmware update terminal 234, disposed correspondingly to the to hollow region and exposed at the bottom portion of the battery recess 242, may be connected to an external electronic device (not shown) to receive update firmware data. More specifically, the firmware stored in the sensing module 232 is configured with a predetermined condition; the predetermined condition is information (to be referred to as a safe range) such as most appropriate tire temperatures and tire pressures in normal condition of a vehicle model on which the sensor body 2 is installed. As different vehicle models May have different safe ranges, different vehicles may have different predetermined conditions. When a user is to relocated the present invention from an old vehicle model to a new vehicle model, the tire pressure sensor is first disassembled from the old vehicle model, followed by detaching the cover 26 and the battery 5 to expose the firmware update terminal 234 through the hollow region at the lower part of the battery recess 242. The external electronic device is then extended into the battery recess 242 to connect to the firmware update terminal 234. After establishing a connection between the external electric device and the sensing module 232 via the firmware update terminal 234, the update firmware data is transmitted to update the firmware originally corresponding to the old vehicle model, to the firmware corresponding to the new vehicle model. After that, the battery 25 and the cover 26 are then re-assembled to the sensor body 2, and the present invention can then continue to be installed on the new vehicle model for utilizing. The external electronic device may be connected to the firmware update terminal 234 via various approaches. In one embodiment, the external electronic device may directly come into contact with the firmware update terminal 234 via at least one probe (not shown). Alternatively, the manufacturer may design a fixture (not shown) corresponding to an appearance of the battery accommodating portion 24, and the external electric device may be steadily connected with the firmware update terminal 24 via engaging the battery accommodating portion 24 with the fixture. It should be noted that, the two examples above are for illustrative purposes, not limiting the connecting means between the firmware update terminal 234 and the external electronic device of the present invention thereto.

Figure 3:
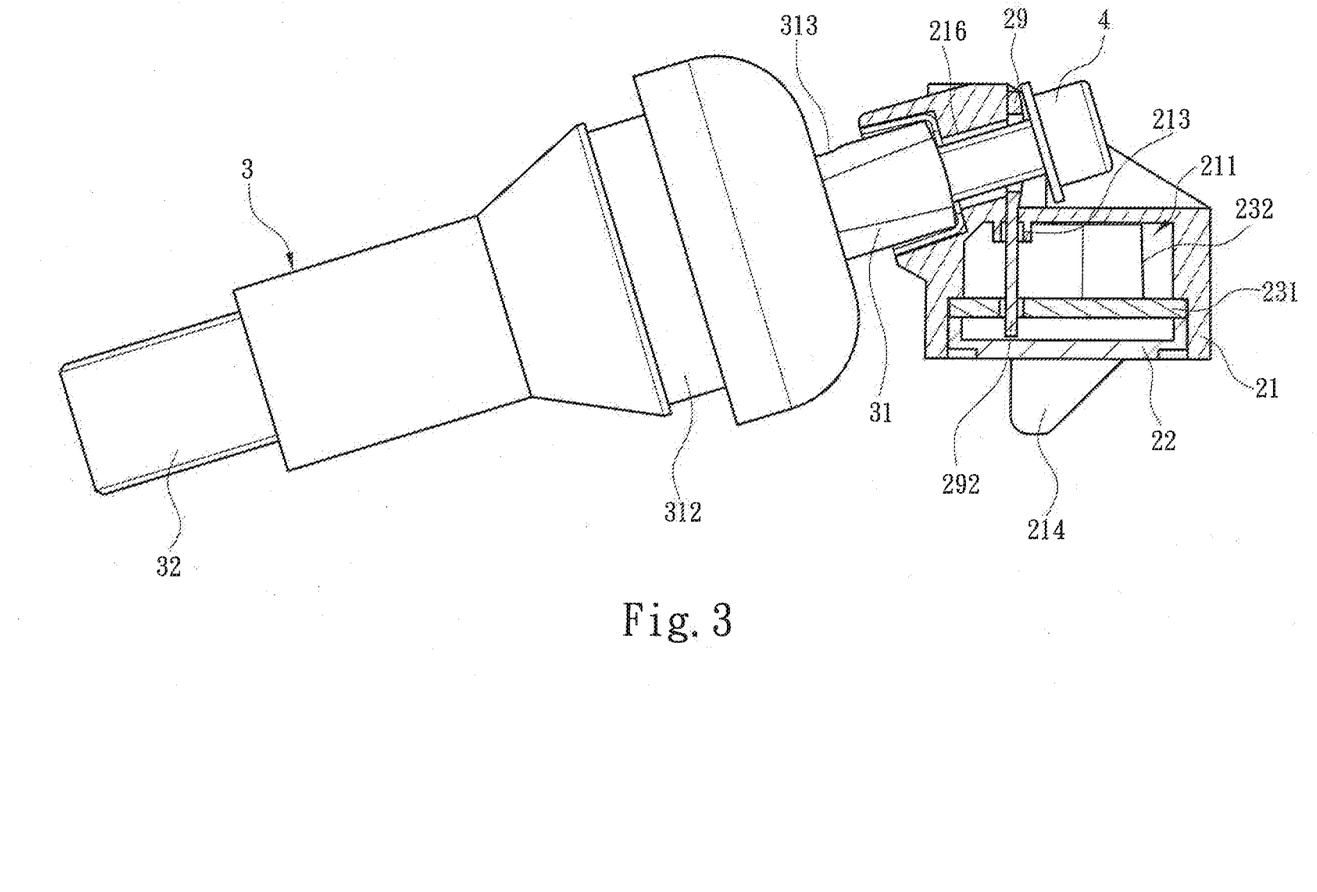
FIG. 3 is a sectional view of a gas intake nozzle of the battery-replaceable tire pressure sensor according to the embodiment of the present invention.

Referring to FIGS. 1 and 3, the gas intake nozzle 3 may be made of a metal material, and includes a coupling section 31 corresponding to the gas nozzle assembly hole 216 and a gas intake section 32 connected to the coupling section 31. The coupling section 31 includes an assembly hole 311, a positioning groove 312 and an air outlet through hole 313. The assembly hole 311 is disposed facing the gas nozzle assembly hole 216. The positioning groove 312 encircles the coupling section 31 and is engaged with the assembly through hole 11 to fasten the gas intake nozzle 3 onto the tire rim 1. The air outlet through hole 313 is disposed between the assembly hole 311 and the positioning groove 312. Further, the gas nozzle assembly hole 216 is disposed at a surface of the first housing 21 opposite to the opening of the accommodating chamber 211. For assembly, the coupling section 31 is first inserted into the gas nozzle assembly hole 216 to contact the two with each other. The gas nozzle assembly member 4, facing the coupling section 31, is inserted into the gas nozzle assembly hole 216 to assemble with the assembly hole 311 of the coupling section 31, so as to steadily connect the gas intake nozzle 3 with the sensor body 2. In the embodiment, the gas nozzle assembly member 4 may be a metal screw, and the assembly hole 311 includes a screw thread corresponding to the screw. The connection method for the gas nozzle assembly member 4 and the assembly hole 311 is not limited to the above approach. The gas intake section 32 penetrates through the assembly through hole 11 of the tire rim 1 to extend to the outside the tire rim 1, and is thus capable of receiving an inflation gas outputted from an inflation device (not shown). The inflation gas passes through the gas intake nozzle 3 and flows from the air outlet through hole 313 inside the tire rim 1 to complete an inflation process.

As shown in FIG. 1, the sensor body 2 further includes an electromagnetic wave transmission element 29 which may be made of metals. The electromagnetic wave transmission element 29 is disposed on the first housing 21, connected to the gas nozzle assembly hole 216, and includes a through hole 291 corresponding to the gas nozzle assembly hole 216 and a transmission pin 292. Referring to FIG. 3, at a bottom part of the accommodating chamber 211, the first housing 21 further includes a transmission opening 213 corresponding to a position of the transmission pin 292. The transmission pin 292 may then penetrate through the transmission opening 213 to extend into the accommodating chamber 211 and to further connect to the circuit board 231. As such, the electromagnetic wave transmission element 29 is electrically connected to the tire pressure sensing module 23. In a preferred embodiment of the present invention, the gas nozzle assembly member 4 penetrates through the through hole 291 of the electromagnetic wave transmission element 29 and the gas nozzle assembly hole 216 to screw and fasten with the assembly hole 311, such that the electromagnetic wave transmission element 29 is clamped between the gas nozzle assembly member 4 and the gas nozzle assembly hole 216 (as shown in FIG. 3). Since the gas nozzle assembly member 4 and the gas intake nozzle 3 may be both made of metals, the tire pressure sensing module 23 may electrically connect to the gas intake nozzle 3 via the electromagnetic wave transmission element 29 and the gas nozzle assembly member 4. Thus, the gas intake nozzle 3 may serve as an antenna for wireless transmission to transmit the tire condition information outputted by the sensing module 232 to the monitoring device. As the gas intake section 32 of the gas intake nozzle 3 is exposed to the outside of the tire rim 1 and thus has less obstruction on wireless transmission paths thereof, improved transmission effects may be achieved. Further, an adhesive (not shown) may be applied to a contact part of the transmission opening 213 and the transmission pin 292 to achieve even better sealing effects.

FIG. 5 shows a schematic view of the battery-replaceable tire pressure sensor of the present invention when in use. As shown in FIG. 5, when the present invention is installed on the tire rim 1, the gas intake section 32 of the gas intake nozzle 3 is inserted into the assembly through hole 11, and the positioning groove 312 of the coupling section 31 is engaged onto the tire rim 1, to make the gas intake nozzle 31 be steadily fastened on the tire rim 1 at all times. Next, the sensor body 2 is connected to the gas intake nozzle 3, and the gas nozzle assembly member 4 penetrates into the gas nozzle assembly hole 216 to assemble the sensor body 2 with the intake gas nozzle 3. Further, the first housing 21 includes at least one support member 214 disposed on a surface facing the connecting section 13 and extending towards the connecting section 13. Instead of directly touching the connecting section 13 and thus receiving drastic vibrations of the tire rim 1, the sensor body 2 is abutted on the connecting section 13 via the support member 214, thereby preventing part damages caused by the vibrations as well as providing a buffering effect.

In conclusion, in the present invention, the sensor body includes a battery accommodating portion and a cover. The battery accommodating portion is for accommodating at least one battery, and the cover is screwed with the battery accommodating portion and for retaining the battery therein. Thus, when electrical power of the sensor body is depleted, the depleted battery may be replaced with a new one, so that the tire pressure sensor can continue to be utilized instead of being replaced by a new tire pressure sensor. Therefore, not only an expense for purchasing a new tire pressure sensor can be saved, but also the amount of wastes is reduced. Further, a sealing ring is disposed on the battery accommodating portion and is clamped between the cover and the first housing when the cover is screwed with the battery accommodating portion. Thus, the sealing ring completely fills possible space between the cover and the battery accommodating portion, thereby further improves the air tightness of the battery accommodating portion and preventing dust or moisture damaging electronic components in the sensor body.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A battery-replaceable tire pressure sensor installed on a tire rim, the tire rim comprising an assembly through hole; the battery-replaceable tire pressure sensor comprising:
   a sensor body, comprising:
      a tire pressure sensing module disposed in the sensor body for detecting a tire pressure;
      a battery accommodating portion accommodating at least one battery for supplying power to the tire pressure sensing module;
      a cover screwing with the battery accommodating portion to retain the battery from disengaging from the battery accommodating portion; and
      a gas nozzle assembly hole;
   a gas intake nozzle, comprising:
      a coupling section inserted into the gas nozzle assembly hole; and
      a gas intake section connecting to the coupling section, penetrating through the assembly through hole and extending towards a direction outside the tire rim for gas to input; and
   a gas nozzle assembly member penetrating through the gas nozzle assembly hole to couple with the gas intake nozzle.

2. The battery-replaceable tire pressure sensor of claim 1, wherein the sensor body further comprises a first housing including an accommodating chamber to accommodate the tire pressure sensing module, and a second housing engaging with the first housing to enclose the accommodating chamber.

3. The battery-replaceable tire pressure sensor of claim 1, wherein the tire pressure sensing module comprises a sensing module which includes a sensing region and saves a firmware for controlling operation of the tire pressure sensing module; the sensor body comprising a gas intake portion corresponding to the sensing region, and a washer disposed between the gas intake portion and the sensing region.

4. The battery-replaceable tire pressure sensor of claim 3, wherein the tire pressure sensing module further comprises at least one firmware update terminal disposed correspondingly to the battery accommodating portion to transmit update firmware data to the sensing module for updating the firmware.

5. The battery-replaceable tire pressure sensor of claim 1, wherein the coupling section further comprises an assembly hole facing the gas nozzle assembly hole to couple with the gas nozzle assembly member, and a positioning groove engaging with the assembly through hole to fasten the gas intake nozzle on the tire rim.

6. The battery-replaceable tire pressure sensor of claim 1, wherein the sensor body further comprises an electromagnetic wave transmission element electrically connected to the tire pressure sensing module to output tire condition information generated by the tire pressure sensing module after detecting the tire pressure.

7. The battery-replaceable tire pressure sensor of claim 6, wherein the electromagnetic wave transmission element comprises a through hole corresponding to the gas nozzle assembly hole for the gas nozzle assembly member to penetrate.

8. The battery-replaceable tire pressure sensor of claim 1, wherein the sensor body further comprises a sealing ring disposed between the battery accommodating portion and the cover.

9. The battery-replaceable tire pressure sensor of claim 1, wherein the sensor body further comprises at least one support member disposed on a surface of the sensor body facing the tire rim and abutting against the tire rim.

\* \* \* \* \*